(12) United States Patent
Song (10) Patent No.: US 11,938,893 B2
(45) Date of Patent: Mar. 26, 2024

(54) SEAT BELT MOUNTING STRUCTURE

(71) Applicants: Hyundai Motor Company, Seoul (KR); Kia Corporation, Seoul (KR)

(72) Inventor: Won Ki Song, Seongnam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/886,736

(22) Filed: Aug. 12, 2022

(65) Prior Publication Data

US 2023/0182677 A1 Jun. 15, 2023

(30) Foreign Application Priority Data

Dec. 15, 2021 (KR) .......................... 10-2021-0179751

(51) Int. Cl.
*B60R 22/24* (2006.01)
*B60R 22/195* (2006.01)
*B60R 22/20* (2006.01)

(52) U.S. Cl.
CPC .......... *B60R 22/24* (2013.01); *B60R 22/1951* (2013.01); *B60R 22/20* (2013.01)

(58) Field of Classification Search
CPC ............................. B60R 22/1951; B60R 22/24
See application file for complete search history.

(56) References Cited

U.S. PATENT DOCUMENTS

| 8,985,632 B1* | 3/2015 | Heckman | B62D 25/04 280/801.2 |
| 2018/0345902 A1* | 12/2018 | Kajiwara | B60R 22/023 |

FOREIGN PATENT DOCUMENTS

| DE | 4341119 A1 * | 6/1995 | ........... B60R 22/023 |
| DE | 102013225661 A1 * | 6/2014 | ........... B62D 25/025 |
| JP | 2003226225 A * | 8/2003 | |
| JP | 2005170228 A * | 6/2005 | |
| JP | 2006096348 A * | 4/2006 | .............. B60J 5/043 |
| JP | 2006315572 A * | 11/2006 | |
| JP | 2007038983 A * | 2/2007 | |
| JP | 2009173170 A * | 8/2009 | |
| JP | 2009173171 A * | 8/2009 | |
| JP | 2009262615 A * | 11/2009 | |
| JP | 2013184658 A * | 9/2013 | ............. B60R 22/24 |
| JP | 2015089792 A * | 5/2015 | |
| JP | 2019182016 A * | 10/2019 | ............. B60R 22/24 |
| JP | 2021030914 A * | 3/2021 | ............ B60J 5/0429 |
| KR | 20220118169 A * | 8/2022 | |
| KR | 20220160842 A * | 12/2022 | |
| WO | WO-2013065388 A1 * | 5/2013 | ............. B60R 22/24 |
| WO | WO-2013132888 A1 * | 9/2013 | ............. B60R 22/24 |
| WO | WO-2014188099 A1 * | 11/2014 | ............. B60R 22/24 |
| WO | WO-2016024433 A1 * | 2/2016 | ............. B60R 13/02 |

* cited by examiner

*Primary Examiner* — Nicole T Verley
(74) *Attorney, Agent, or Firm* — Slater Matsil, LLP (57) ABSTRACT

An embodiment seat belt mounting structure includes a front seat disposed towards a front of a vehicle body, a rear seat disposed towards a rear of the vehicle body, a center pillar part, a rear pillar part disposed behind the center pillar part, a side reinforcement connecting the center pillar part and the rear pillar part, and a rear seat retractor coupled to the side reinforcement.

20 Claims, 14 Drawing Sheets

SEAT BELT MOUNTING STRUCTURE

CROSS-REFERENCE TO RELATED APPLICATIONS

This application claims the benefit of Korean Patent Application No. 10-2021-0179751, filed on Dec. 15, 2021, which application is hereby incorporated herein by reference.

TECHNICAL FIELD

The present invention relates to a seat belt mounting structure.

BACKGROUND

A general vehicle seat is disposed toward the front of a vehicle body, but the rear facing seat disposed toward the rear of the vehicle body may also be disposed for convenience or space utilization of the occupant.

In the case of the rear facing seat, it is disposed adjacent to the general seat disposed toward the front in order to increase space utilization, and the mount position of the seat belt of the general seat and the seat belt of the rear facing seat may be configured adjacently.

However, when the mount position of the seat belt is configured adjacently, a separate reinforcing material is required to secure the strength required for the mount position of the seat belt.

The above information disclosed in this background section is only for enhancement of understanding of the background of the invention, and therefore it may contain information that does not form the prior art that is already known to a person of ordinary skill in the art.

SUMMARY

The present invention relates to a seat belt mounting structure. Particular embodiments relate to a seat belt mounting structure capable of improving center pillar connectivity strength.

Embodiments of the present invention can provide a seat belt mounting structure capable of mounting a seat belt without additional reinforcement. In addition, embodiments of the present invention can provide a seat belt mounting structure that may improve center pillar connectivity strength without additional reinforcement.

A seat belt mounting structure according to an exemplary embodiment of the present invention may include a front seat disposed toward a front of a vehicle body, a rear seat disposed toward a rear of the vehicle body, a center pillar part, a rear pillar part disposed behind the center pillar part, a side reinforcement connecting the center pillar part and the rear pillar part, and a rear seat retractor coupled to the side reinforcement.

The side reinforcement may include an upper flange formed to protrude in the vehicle inner direction and a lower flange formed to protrude in the vehicle inner direction under the upper flange, and the rear seat retractor may be coupled to the upper flange and the lower flange.

The seat belt mounting structure according to an exemplary embodiment of the present invention may further include a side sill disposed in the vehicle body length direction and of which a side sill flange is formed thereto, and the rear seat retractor may be coupled to the side sill flange and the lower part of the side reinforcement.

The center pillar part may include a roof side inner and a center pillar inner in which the upper part is overlapped with the roof side inner, and the seat belt mounting structure may further include a rear seat upper anchor coupled to the overlap portion overlapping the roof side inner and the center pillar inner.

The seat belt mounting structure according to an exemplary embodiment of the present invention may further include a height adjustable bracket coupled to the overlap portion, and the rear seat upper anchor may be coupled through the height adjustable bracket.

The height adjustable bracket may include an upper bracket member connected along the length direction of the vehicle body to the overlap portion and a lower bracket member connected to the lower part of the upper bracket member along the height direction of the center pillar inner, and the rear seat upper anchor is coupled to the upper bracket member.

The height adjustable bracket may further include a height adjustment roller mounted on the lower bracket member, and the seat belt mounting structure may further include a front seat upper anchor mounted on the height adjustment roller.

The seat belt mounting structure according to an exemplary embodiment of the present invention may further include a rear seat D-ring lower anchor coupled to the lower portion of the center pillar inner.

The seat belt mounting structure according to an exemplary embodiment of the present invention may further include a side sill inner disposed in the vehicle body length direction, and the rear seat D-ring lower anchor is mounted on an overlap portion of the center pillar inner and the side sill inner.

The seat belt mounting structure according to an exemplary embodiment of the present invention may further include a front seat D-ring lower anchor mounted on the overlap portion of the center pillar inner and the side sill inner.

The seat belt mounting structure according to an exemplary embodiment of the present invention may further include a front seat retractor mounted on the overlap portion of the center pillar inner and the side sill inner.

The seat belt mounting structure according to an exemplary embodiment of the present invention may further include a partition disposed between the front seat and the rear seat, and the partition may be combined with the center pillar part.

According to the seat belt mounting structure according to an exemplary embodiment of the present invention, the seat belt may be mounted without a separate reinforcement.

In addition, according to the seat belt mounting structure according to an exemplary embodiment of the present invention, it is possible to improve the center pillar connectivity strength without additional reinforcement.

In addition, the effects obtainable or predicted by the embodiments of the present invention are to be disclosed directly or implicitly in the detailed description of the embodiments of the present invention. That is, various effects predicted according to exemplary embodiments of the present invention will be disclosed within a detailed description to be described later.

BRIEF DESCRIPTION OF THE DRAWINGS

Since these drawings are for reference in describing exemplary embodiments of the present invention, the technical spirit of the present invention should not be construed as being limited to the accompanying drawings.

The following reference identifiers may be used in connection with the accompanying drawings to describe exemplary embodiments of the present disclosure.

| | |
|---|---|
| 10: vehicle body | 20: front seat |
| 22: rear seat | 30: center pillar part |
| 32: roof side inner | 34: center pillar inner |
| 36: upper overlap portion | 38: lower overlap portion |
| 39: front seat retractor hole | 40: center pillar outer reinforcement |
| 45: rear pillar part | 50: side reinforcement |
| 52: upper flange | 54, 55: lower flange |
| 56: side reinforcement body | 60: rear seat retractor |
| 62: front seat retractor | 70: side sill |
| 72: side sill flange | 74: side sill inner |
| 76: side sill outer | 80: rear seat upper anchor |
| 81: upper anchor bolt hole | 82: first lower connection hole |
| 83: second lower connection hole | 84: third lower connection hole |
| 90: height adjustable bracket | 92: upper bracket member |
| 94: lower bracket member | 96: height adjustment roller |
| 100: front seat upper anchor | 110: rear seat D-ring lower anchor |
| 112: front seat D-ring lower anchor | 120: partition |
| 130: floor panel | 140: rear seat belt |
| 142: front seat belt | |

DETAILED DESCRIPTION OF ILLUSTRATIVE EMBODIMENTS

Embodiments of the present invention will be described more fully hereinafter with reference to the accompanying drawings, in which exemplary embodiments of the invention are shown.

As those skilled in the art would realize, the described embodiments may be modified in various different ways, all without departing from the spirit or scope of the present invention.

In order to clearly explain embodiments of the present invention, parts irrelevant to the description are omitted, and the same reference numerals are assigned to the same or similar elements throughout the specification.

Since the size and thickness of each component shown in the drawings are arbitrarily indicated for convenience of description, the present invention is not necessarily limited to those shown in the drawings, and the thicknesses are enlarged to clearly express various parts and regions.

In addition, in the following detailed description, the reason that the names of components are divided into first, second, etc. is to classify them in the same relationship, and it is not necessarily limited to the order in the following description.

Throughout the specification, when a part includes a certain element, it means that other elements may be further included, rather than excluding other elements, unless specifically stated otherwise.

In addition, terms such as . . . part, . . . described in the specification mean a unit of a comprehensive configuration that performs at least one function or operation.

When a part, such as a layer, film, region, plate, etc., is "on" another part, this includes not only the case where it is directly above the other part, but also the case where there is another part in between.

In contrast, when an element is referred to as being "directly on" another element, there are no intervening elements present.

Exemplary embodiments of the present invention will hereinafter be described in detail with reference to the accompanying drawings.

Figure 1:
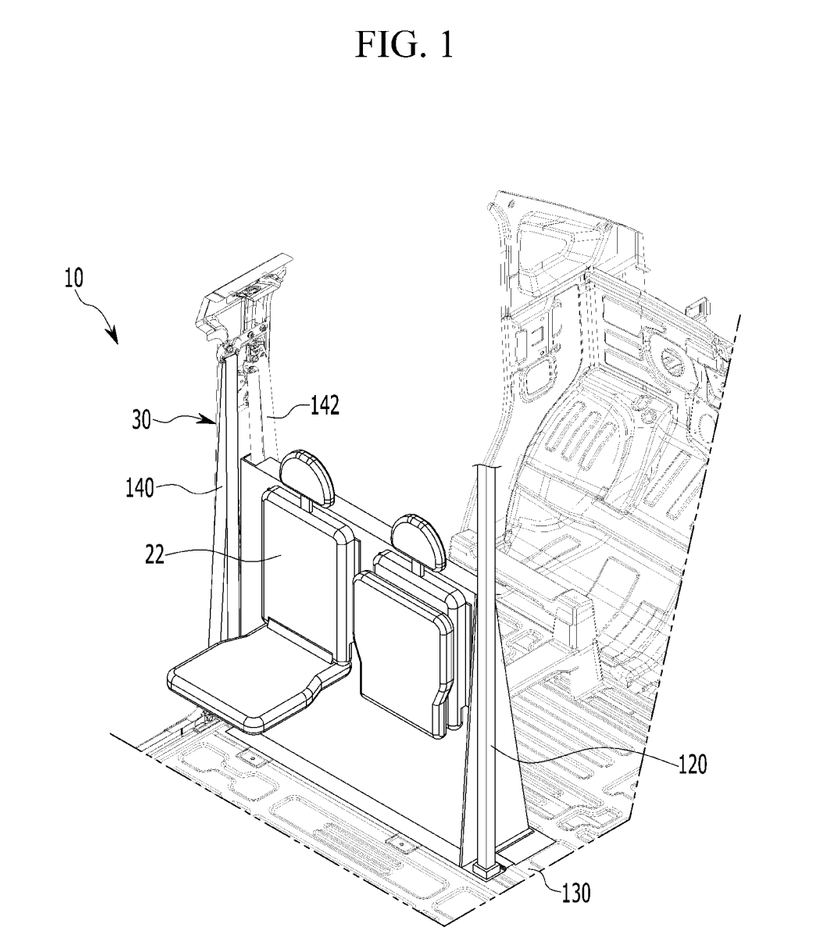
FIG. 1 is a partial perspective view of a vehicle body to which a seat belt mounting structure according to an exemplary embodiment of the present invention may be applied.
Figure 2:
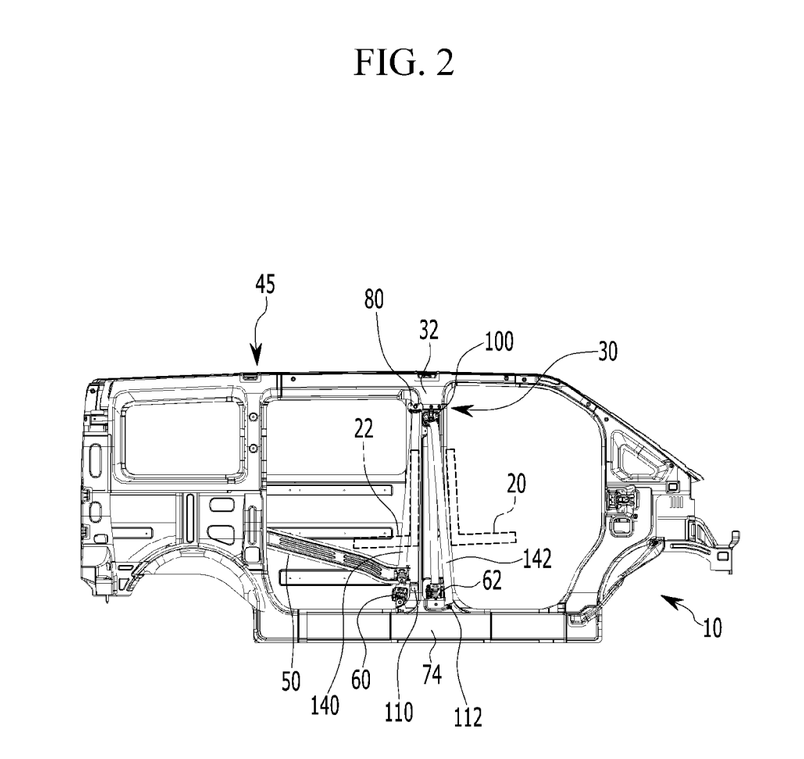
FIG. 2 is a partial side view of a vehicle body to which a seat belt mounting structure according to an exemplary embodiment of the present invention may be applied.

FIG. 1 is a partial perspective view of a vehicle body to which a seat belt mounting structure according to an exemplary embodiment of the present invention may be applied, and FIG. 2 is a partial side view of a vehicle body to which a seat belt mounting structure according to an exemplary embodiment of the present invention may be applied.

Referring to FIG. 1 and FIG. 2, a vehicle body 10 to which a seat belt mounting structure according to an exemplary embodiment of the present invention may be applied includes a front seat 20 disposed toward the front of the vehicle body 10 and a rear seat 22 disposed toward the rear of the vehicle body 10.

The rear seat 22 is a so-called rear facing seat, which is disposed adjacent to the front seat 20 to increase space utilization in the vehicle, and the mount positions of a front seat belt 142 for the front seat 20 and a rear seat belt 140 for the rear seat 22 are adjacent to each other.

Figure 3:
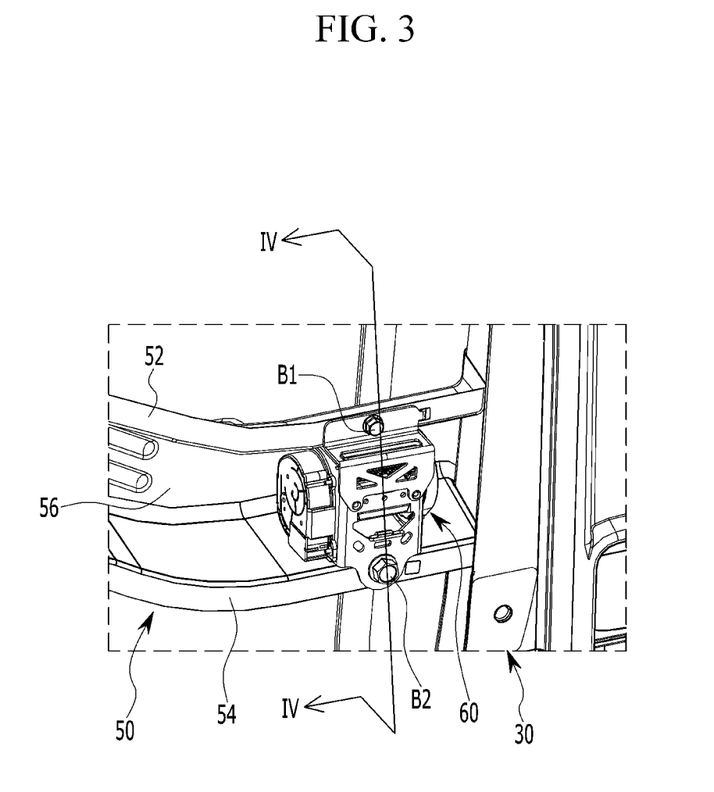
FIG. 3 is a perspective view illustrating the mount of a rear seat retractor of the seat belt mounting structure according to an exemplary embodiment of the present invention.
Figure 4:
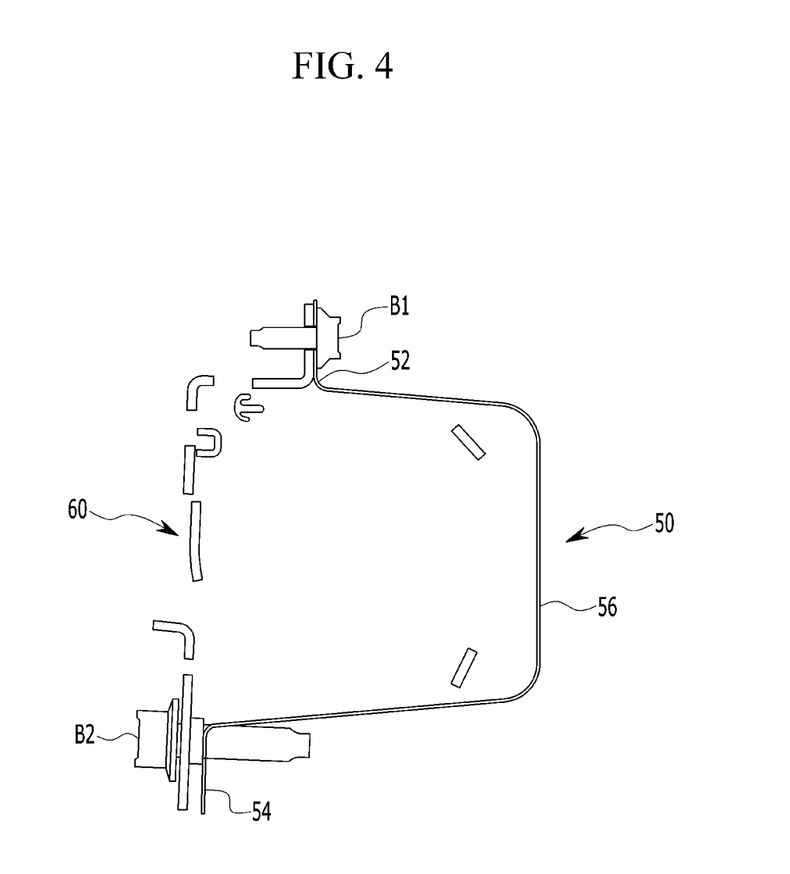
FIG. 4 is a cross-sectional view along the IV-IV line of FIG. 3.

FIG. 3 is a perspective view illustrating the mount of a rear seat retractor of the seat belt mounting structure according to an exemplary embodiment of the present invention, and FIG. 4 is a cross-sectional view along the IV-IV line of FIG. 3.

Referring to FIG. 1 to FIG. 4, a seat belt mounting structure according to an exemplary embodiment of the present invention may include a center pillar part 30, a rear pillar part 45 disposed behind the center pillar part 30, a side reinforcement 50 connecting the center pillar part 30 and the rear pillar part 45, and a rear seat retractor 60 coupled to the side reinforcement 50.

The side reinforcement 50 increases the connection strength by connecting the center pillar part 30 and the rear pillar part 45, and may respond to a side collision of the vehicle.

The side reinforcement 50 includes an upper flange 52 formed to protrude in the vehicle inner direction and a lower flange 54 formed to protrude in the vehicle inner direction under the upper flange 52, and the rear seat retractor 60 may be coupled to the upper flange 52 and the lower flange 54.

For example, the rear seat retractor 60 may be coupled to the upper flange 52 and the lower flange 54 through first and second bolts B1 and B2, respectively.

The upper flange 52 and the lower flange 54 are formed to protrude from a side reinforcement body 56, and the rear seat retractor 60 may be mounted in the space formed by the upper flange 52, the lower flange 54 and the side reinforcement body 56, so that it is possible to improve the space utilization of the side reinforcement 50.

In addition, the side reinforcement 50 may be increased in strength against side impact by the side reinforcement body 56 and the shape of the upper flange 52 and the lower flange 54 protruding from the side reinforcement body 56.

Figure 5:
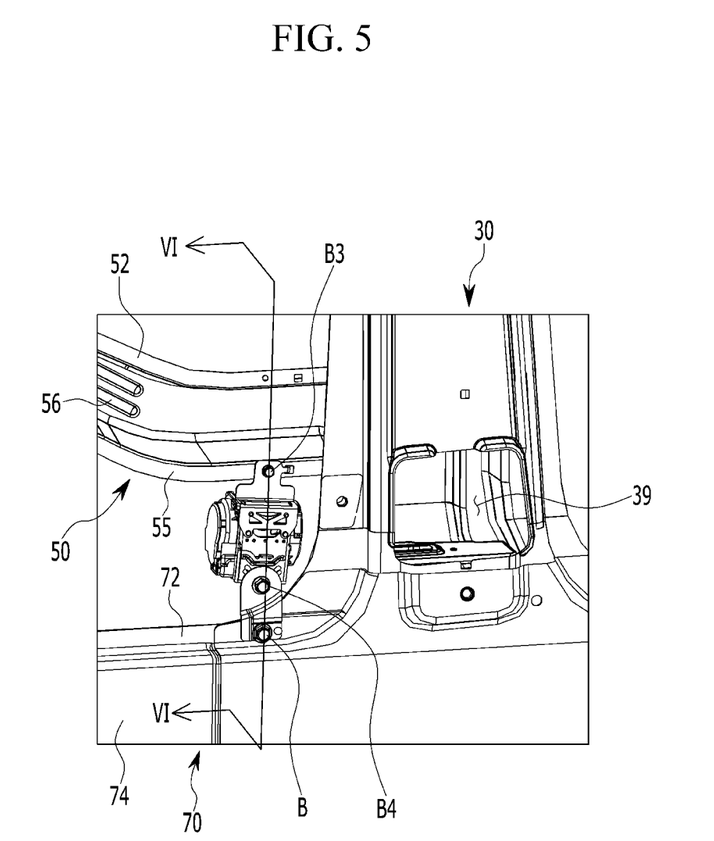
FIG. 5 is a perspective view illustrating the mount of the rear seat retractor of the seat belt mounting structure according to another exemplary embodiment of the present invention.
Figure 6:
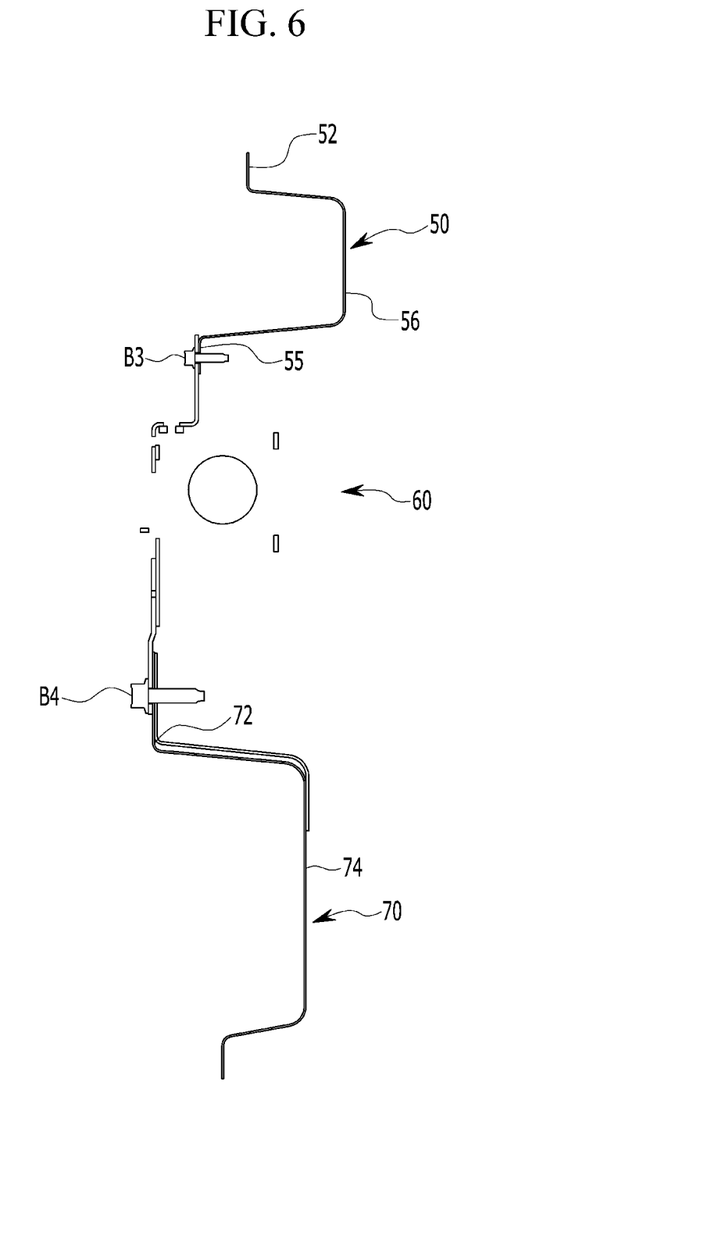
FIG. 6 is a cross-sectional view along the VI-VI line of FIG. 5.

FIG. 5 is a perspective view illustrating the mount of the rear seat retractor of the seat belt mounting structure according to another exemplary embodiment of the present invention, and FIG. 6 is a cross-sectional view along the VI-VI line of FIG. 5.

In describing the seat belt mounting structure according to another embodiment of the present invention shown in FIGS. 5 and 6, the same or similar components use the same or similar reference numbers as described above with reference to FIGS. 1 to 4, and repeated descriptions are omitted.

Referring to FIG. 5 and FIG. 6, the seat belt mounting structure according to an exemplary embodiment of the present invention further includes a side sill 70 disposed in the vehicle body 10 length direction and of which a side sill flange 72 is formed thereto, and the rear seat retractor 60 may be coupled to the side sill flange 72 and the lower part of the side reinforcement 50.

The side reinforcement 50 may include a side reinforcement body 56, and an upper flange 52 and a lower flange 55 protrude from the side reinforcement body 56. The rear seat retractor 60 may be coupled to the lower flange 55 and the side sill flange 72 through third and fourth bolts B3 and B4, respectively.

The rear seat retractor 60 may be mounted in the space between the lower flange 55 and the side sill flange 72, thereby improving the space utilization of the vehicle body 10.

Figure 7:
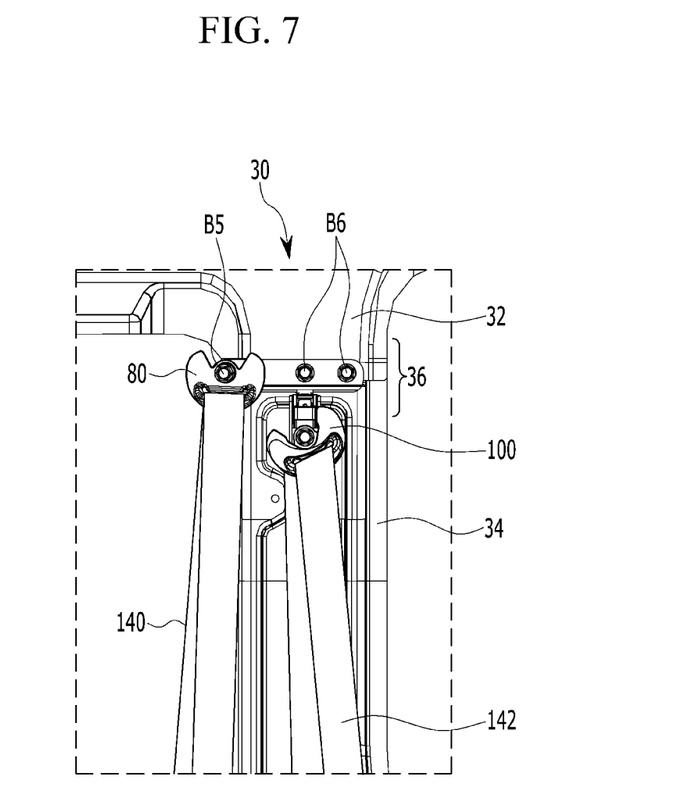
FIG. 7 is a drawing showing the upper portion of the center pillar part of the seat belt mounting structure according to an exemplary embodiment of the present invention.
Figure 8:
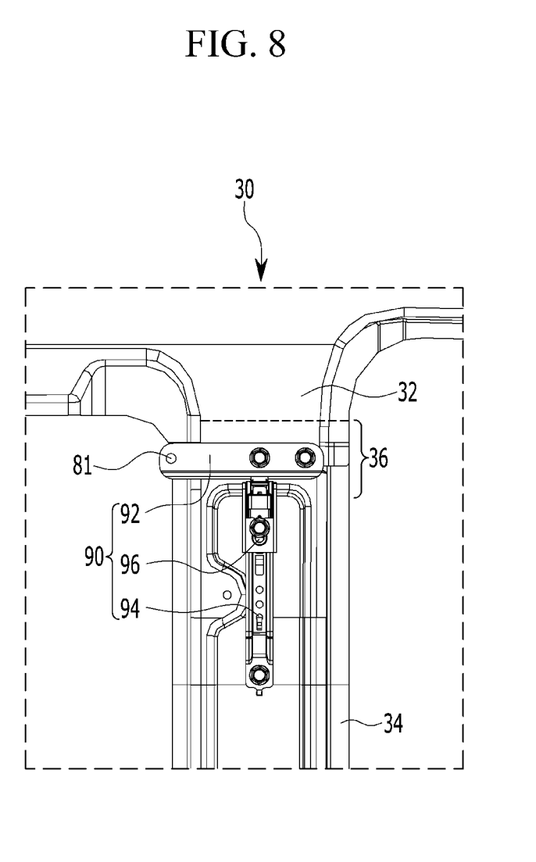
FIG. 8 is a drawing excluding some configurations in FIG. 7.

FIG. 7 is a drawing showing the upper portion of the center pillar part of the seat belt mounting structure according to an exemplary embodiment of the present invention, and FIG. 8 is a drawing excluding some configurations in FIG. 7.

Referring to FIG. 7 and FIG. 8, the center pillar part 30 includes a roof side inner 32 and a center pillar inner 34 in which the upper part is overlapped with the roof side inner 32.

That is, the lower portion of the roof side inner 32 and the upper portion of the center pillar inner 34 may overlap to form an upper overlap portion 36.

The seat belt mounting structure according to an exemplary embodiment of the present invention may further include a rear seat upper anchor 8o that is coupled to the overlap portion overlapping the roof side inner 32 and the center pillar inner 34, that is, the upper overlap portion 36.

The rear seat upper anchor 8o is combined with the upper overlap portion 36 to improve the connectivity strength of the roof side inner 32 and the center pillar inner 34 without additional reinforcement, and the load required for the mount of the rear seat upper anchor 8O may be satisfied.

The seat belt mounting structure according to an exemplary embodiment of the present invention may further include a height adjustable bracket 90 coupled to the overlap portion, and the rear seat upper anchor 8O may be coupled through the height adjustable bracket 90.

The height adjustable bracket 90 may include an upper bracket member 92 connected along the length direction of the vehicle body 10 to the overlap portion, that is, the upper overlap portion 36, and a lower bracket member 94 connected to the lower part of the upper bracket member 92 along the height direction of the center pillar inner 34.

The rear seat upper anchor 8O may be coupled to the upper bracket member 92.

That is, as shown in the drawing, a bolt B5 is inserted into the upper anchor bolt hole 81 formed in the upper bracket member 92 to mount the rear seat upper anchor 8O.

The height adjustable bracket 90 may further include a height adjustment roller 96 mounted on the lower bracket member 94, and the seat belt mounting structure according to an exemplary embodiment of the present invention may further include a front seat upper anchor 100 mounted on the height adjustment roller 96.

The front seat upper anchor 100 is mounted on the height adjustment roller 96, and a driver or occupant riding on the front seat 20 can adjust the position of the front seat upper anchor 100.

Figure 9:
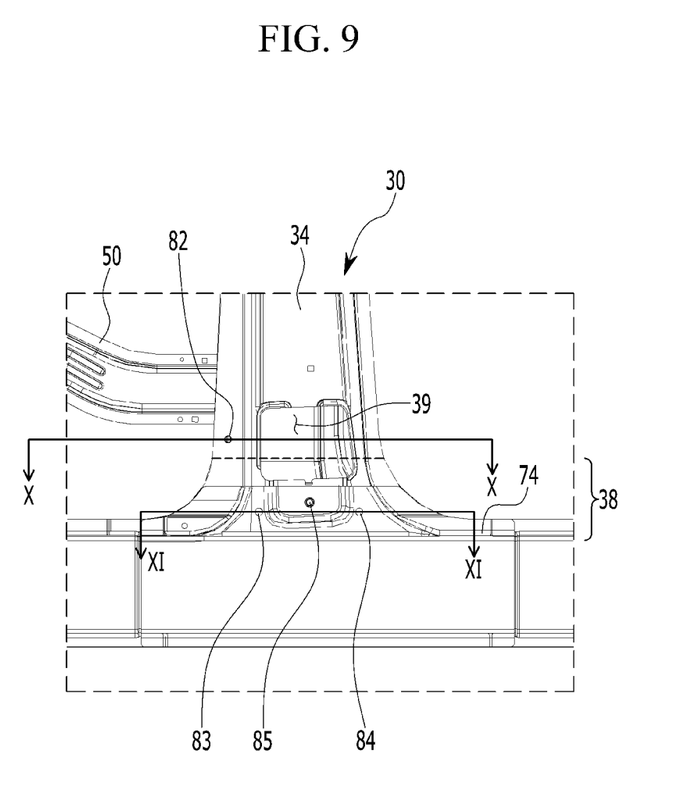
FIG. 9 is a drawing excluding some configurations of the lower portion of the center pillar part of the seat belt mounting structure according to an exemplary embodiment of the present invention.
Figure 10:
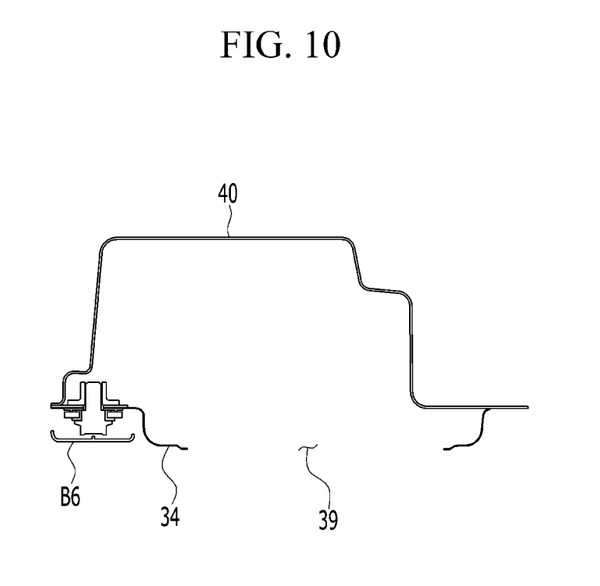
FIG. 10 is a cross-sectional view along the X-X line of FIG. 9.

FIG. 9 is a drawing excluding some configurations of the lower portion of the center pillar part of the seat belt mounting structure according to an exemplary embodiment of the present invention, and FIG. 10 is a cross-sectional view along the X-X line of FIG. 9.

Referring to FIGS. 2, 9 and FIG. 10, the seat belt mounting structure according to an exemplary embodiment of the present invention may further include a rear seat D-ring lower anchor no coupled to the lower portion of the center pillar inner 34.

A first lower connection hole 82 is formed in the lower part of the center pillar inner 34, and a bolt B6 is inserted into the first lower connection hole 82 to connect the rear seat D-ring lower anchor 110.

Reference number 40 in the drawing indicates the center pillar outer reinforcement constituting the center pillar part 30 by combining with the center pillar inner 34.

Figure 11:
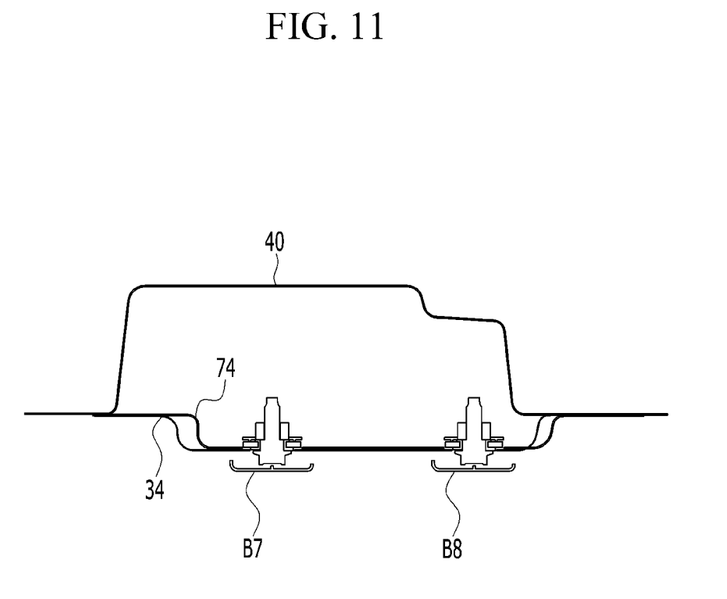
FIG. 11 is a cross-sectional view along the line XI-XI line of FIG. 9.

FIG. 11 is a cross-sectional view along the line XI-XI line of FIG. 9.

Referring to FIG. 2, FIG. 9 and FIG. 11, alternatively, the seat belt mounting structure according to an exemplary embodiment of the present invention further includes a side sill inner 74 disposed in the vehicle body 10 length direction, and the rear seat D-ring lower anchor 110 may be mounted on an overlap portion of the center pillar inner 34 and the side sill inner 74.

The center pillar inner 34 and the side sill inner 74 are overlapped and combined, forming a lower overlap portion 38 in the overlap portion, and the rear seat D-ring lower anchor no is combined in the lower overlap portion 38 to increase connectivity strength.

A second lower connection hole 83 is formed in the lower overlap portion 38, and a bolt B7 is inserted into the second lower connection hole 83 to combine the rear seat D-ring lower anchor 110.

Figure 12:
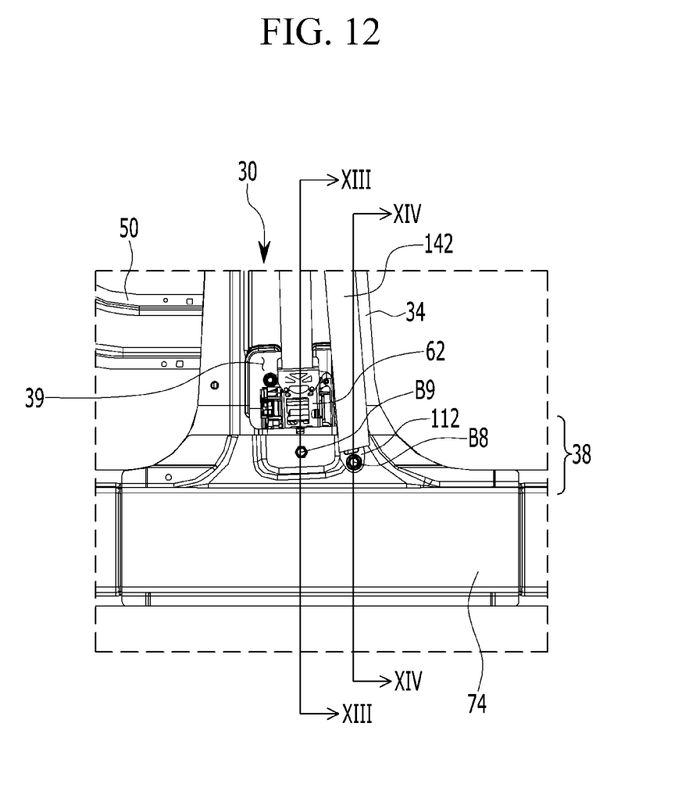
FIG. 12 is a drawing showing the lower portion of the center pillar part of the seat belt mounting structure according to an exemplary embodiment of the present invention.
Figure 13:
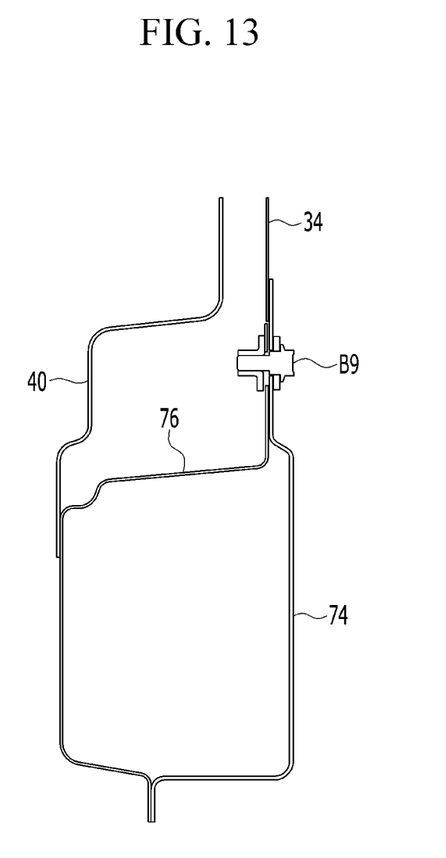
FIG. 13 is a cross-sectional view along the XIII-XIII line of FIG. 12.
Figure 14:
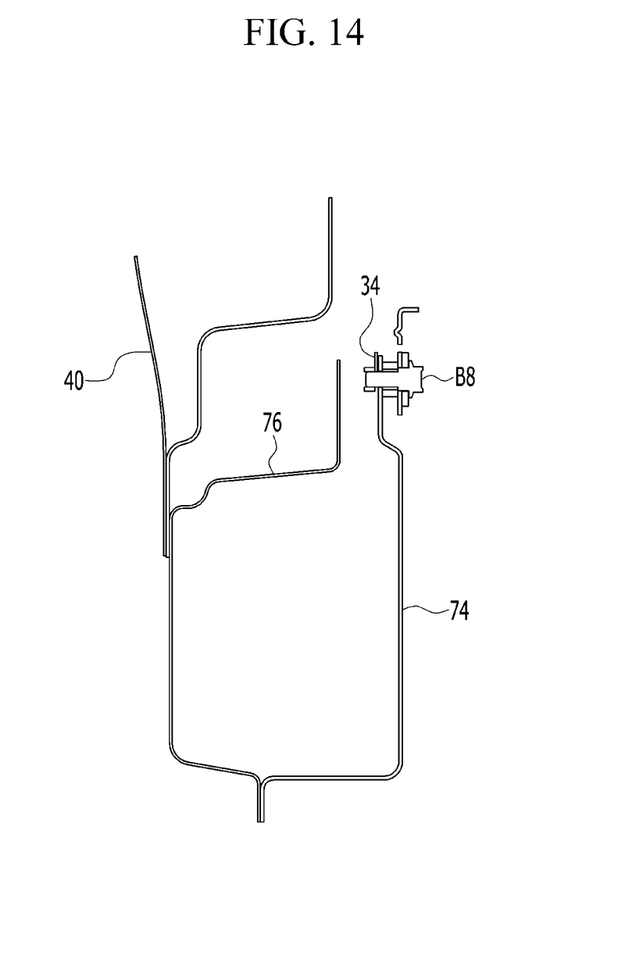
FIG. 14 is a cross-sectional view along the XIV-XIV line of FIG. 12.

FIG. 12 is a drawing showing the lower portion of the center pillar part of the seat belt mounting structure according to an exemplary embodiment of the present invention, FIG. 13 is a cross-sectional view along the XIII-XIII line of FIG. 12, and FIG. 14 is a cross-sectional view along the XIV-XIV line of FIG. 12.

Referring to FIG. 2, FIG. 9, FIG. 12 and FIG. 14, the seat belt mounting structure according to an embodiment of the present invention may further include a front seat D-ring lower anchor 112 mounted on an overlapping portion of the center pillar inner 34 and the side sill inner 74.

A third lower connection hole 84 is formed in the lower overlap portion 38, and a bolt B8 is inserted into the third lower connection hole 84 to combine the front seat D-ring lower anchor 112.

By combining the front seat D-ring lower anchor 112 in the lower overlap portion 38, connectivity strength may be further increased.

In FIG. 14, reference numeral 76 denotes a side sill outer.

Referring to FIG. 2, FIG. 9, FIG. 12 and FIG. 13, the seat belt mounting structure according to an embodiment of the present invention may further include a front seat retractor 62 mounted on the overlap portion of the center pillar inner 34 and the side sill inner 74.

A fourth lower connection hole 85 is formed in the lower overlap portion 38, and a bolt B9 is inserted into the fourth lower connection hole 85 to combine the front seat retractor 62.

A front seat retractor hole 39 is formed in the center pillar inner 34, and the front seat retractor 62 may be inserted inside the front seat retractor hole 39, thereby increasing space utilization.

In addition, by combining the front seat retractor 62 to the lower overlap portion 38, connectivity strength may be further increased.

Referring to FIG. 1 and FIG. 2, the seat belt mounting structure according to an exemplary embodiment of the present invention may further include a partition 120 disposed between the front seat 20 and the rear seat 22, and the partition 120 may be combined with the center pillar part 30.

The partition 120 is mounted on the floor panel 130, combined with the center pillar part 30, and the front seat 20 and the rear seat 22 may be mounted on the partition 120 to respond to vehicle side collisions.

As described above, according to the seat belt mounting structure according to an exemplary embodiment of the present invention, the seat belt may be mounted without a separate reinforcing element.

In addition, according to the seat belt mounting structure according to an exemplary embodiment of the present invention, it is possible to improve the center pillar connectivity strength without a separate reinforcing element.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A seat belt mounting structure comprising:
a front seat disposed towards a front of a vehicle body;
a rear seat disposed towards a rear of the vehicle body;
a center pillar part;
a rear pillar part disposed behind the center pillar part;
a side reinforcement connecting the center pillar part and the rear pillar part;
a side sill disposed under the side reinforcement; and
a rear seat retractor coupled to the side reinforcement.

2. The seat belt mounting structure of claim 1, wherein the side reinforcement comprises:
an upper flange protruding in an inner direction of the vehicle body; and
a lower flange protruding in the inner direction of the vehicle body under the upper flange, wherein the rear seat retractor is coupled to the upper flange and the lower flange.

3. The seat belt mounting structure of claim 1, wherein the side sill is disposed in a length direction of the vehicle body, and wherein the seat belt mounting structure further comprises a side sill flange coupled to the side sill, wherein the rear seat retractor is coupled to the side sill flange and a lower part of the side reinforcement.

4. The seat belt mounting structure of claim 1, wherein the center pillar part comprises:
a roof side inner; and
a center pillar inner having an upper part overlapped with the roof side inner to define an overlap portion.

5. The seat belt mounting structure of claim 4, wherein the seat belt mounting structure further comprises a rear seat upper anchor coupled to the overlap portion.

6. The seat belt mounting structure of claim 5, further comprising a height adjustable bracket coupled to the overlap portion, wherein the rear seat upper anchor is coupled through the height adjustable bracket.

7. The seat belt mounting structure of claim 6, wherein the height adjustable bracket comprises:
an upper bracket member connected along a length direction of the vehicle body to the overlap portion, wherein the rear seat upper anchor is coupled to the upper bracket member; and
a lower bracket member connected to a lower part of the upper bracket member along a height direction of the center pillar inner.

8. The seat belt mounting structure of claim 7, wherein:
the height adjustable bracket further comprises a height adjustment roller mounted on the lower bracket member; and
the seat belt mounting structure further comprises a front seat upper anchor mounted on the height adjustment roller.

9. The seat belt mounting structure of claim 1, further comprising a partition disposed between the front seat and the rear seat, wherein the partition is combined with the center pillar part.

10. The seat belt mounting structure of claim 1, wherein the center pillar part comprises a center pillar inner, and wherein the seat belt mounting structure further comprises a rear seat D-ring lower anchor coupled to a lower portion of the center pillar inner.

11. The seat belt mounting structure of claim 10, further comprising a side sill inner disposed in a length direction of the vehicle body, wherein the rear seat D-ring lower anchor is mounted on an overlap portion of the center pillar inner and the side sill inner.

12. The seat belt mounting structure of claim 11, further comprising a front seat D-ring lower anchor mounted on the overlap portion of the center pillar inner and the side sill inner.

13. The seat belt mounting structure of claim 11, further comprising a front seat retractor mounted on the overlap portion of the center pillar inner and the side sill inner.

14. A vehicle comprising:
a vehicle body;

a front seat disposed towards a front of the vehicle body;
a rear seat disposed towards a rear of the vehicle body;
a center pillar part comprising a roof side inner and a center pillar inner having an upper part overlapped with the roof side inner to define an overlap portion;
a rear pillar part disposed behind the center pillar part in a length direction of the vehicle;
a side reinforcement connecting the center pillar part and the rear pillar part;
a side sill disposed in the length direction of the vehicle;
a side sill flange coupled to the side sill; and
a rear seat retractor coupled to the side sill flange and a lower part of the side reinforcement.

15. The vehicle of claim 14, wherein the side reinforcement comprises:
   an upper flange protruding in an inner direction of the vehicle body; and
   a lower flange protruding in the inner direction of the vehicle body under the upper flange, wherein the rear seat retractor is coupled to the upper flange and the lower flange.

16. The vehicle of claim 14, further comprising a rear seat upper anchor coupled to the overlap portion.

17. The vehicle of claim 16, further comprising a height adjustable bracket coupled to the overlap portion, wherein the rear seat upper anchor is coupled through the height adjustable bracket.

18. The vehicle of claim 17, wherein the height adjustable bracket comprises:
   an upper bracket member connected along the length direction of the vehicle body to the overlap portion, wherein the rear seat upper anchor is coupled to the upper bracket member; and
   a lower bracket member connected to a lower part of the upper bracket member along a height direction of the center pillar inner.

19. The vehicle of claim 18, wherein the height adjustable bracket further comprises a height adjustment roller mounted on the lower bracket member, and wherein the vehicle further comprises a front seat upper anchor mounted on the height adjustment roller.

20. The vehicle of claim 14, further comprising a partition disposed between the front seat and the rear seat, wherein the partition is combined with the center pillar part.

* * * * *